Feb. 6, 1962     C. J. STIEFEL ET AL     3,019,743
LID FOR VEHICLES, ESPECIALLY FREIGHT CARS AND TRUCKS
Filed Oct. 24, 1958     2 Sheets-Sheet 1
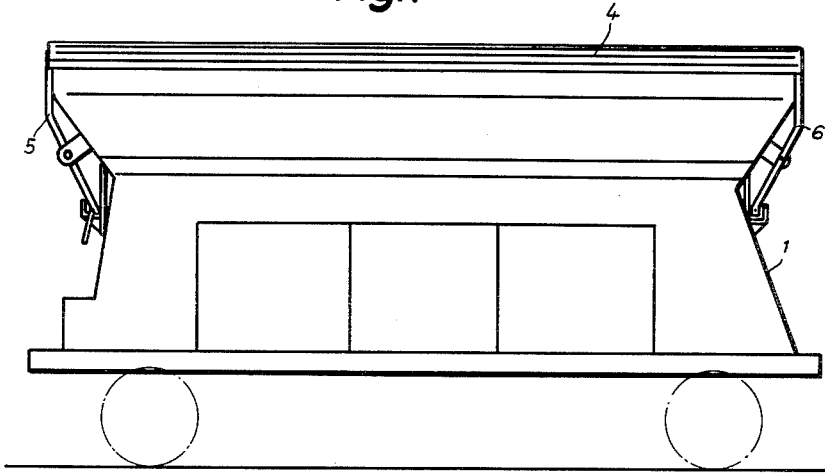
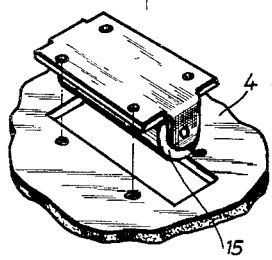
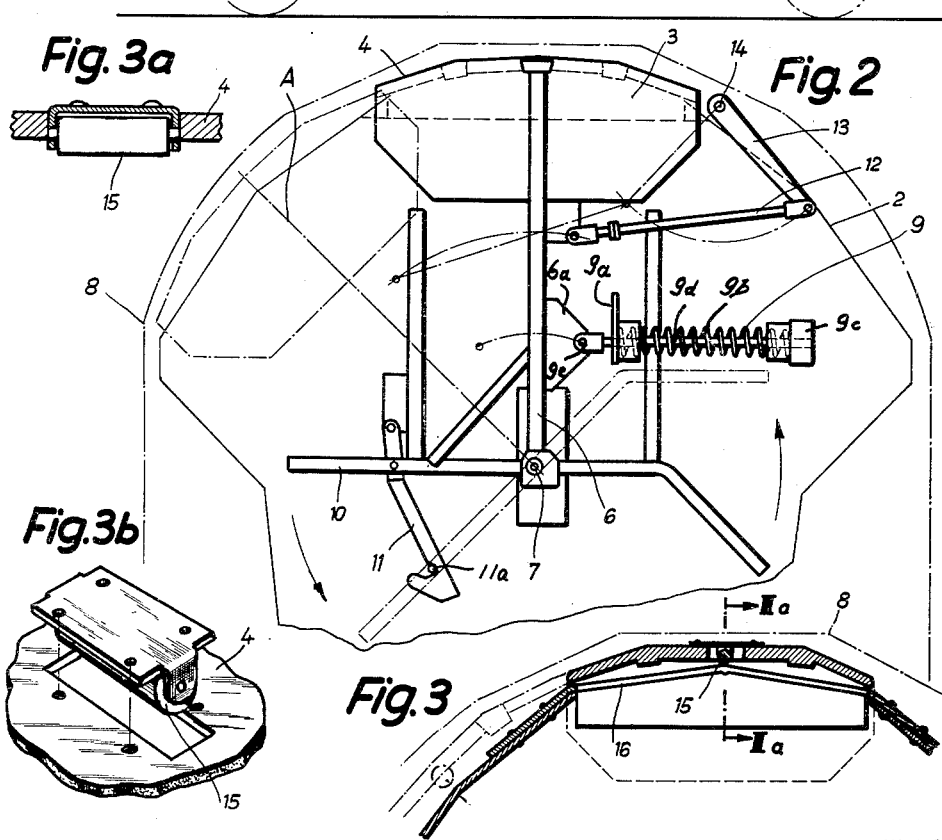
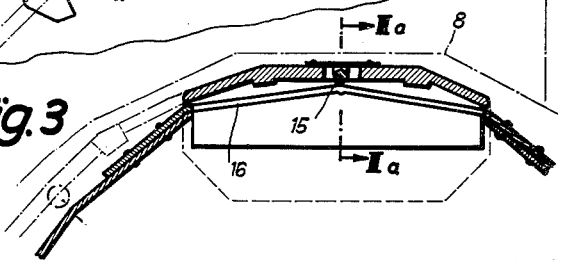
INVENTORS:
Christian J. Stiefel
Helmut F. König
BY
Walter Becker
Patent Agent Feb. 6, 1962 C. J. STIEFEL ET AL 3,019,743
LID FOR VEHICLES, ESPECIALLY FREIGHT CARS AND TRUCKS
Filed Oct. 24, 1958 2 Sheets-Sheet 2

INVENTOR.
Christian J. Stiefel
Helmut F. König
BY
Patent Agent.

United States Patent Office 3,019,743
Patented Feb. 6, 1962

3,019,743
LID FOR VEHICLES, ESPECIALLY FREIGHT CARS AND TRUCKS
Christian J. Stiefel, Aachen, and Helmut F. König, Minden, Westphalia, Germany, assignors to Waggonfabrik Talbot, Aachen, Germany
Filed Oct. 24, 1958, Ser. No. 769,425
Claims priority, application Germany Nov. 22, 1957
1 Claim. (Cl. 105—377)

The present invention relates to a lid, and more specifically, to a closure arrangement for vehicles, especially railroad freight cars and trucks.

When transporting hydroscopic or humidity sensitive pourable goods such as burned or calcined lime, manuring lime, soda, cement, grain, etc. in rail vehicles or trucks, such vehicles must be covered. Generally, such vehicles have a cover in the form of a solid roof. In order to be able to load such covered vehicles, it is known to provide tiltable lids in the roof which may be opened for purposes of loading the respective vehicle. These tiltable lids usually consist of two parts and are arranged either on a beam extending along the central longitudinal vertical plane of the vehicle or each of the tiltable lids is arranged on a fixed roof portion laterally of the longitudinal central plane of the vehicle. The size of the lid is so selected that they can be opened and closed by one operator. Depending on the length of the vehicle, each vehicle has from six to twelve or even more tiltable lids.

The tiltable lid is supported by the longitudinal beam along the central plane of the vehicle which beam in its turn is supported by one or two spars. Also a plurality of transverse spars may be arranged in such a way that the ends of two lids rest on each intermediate spar, while one lid end rests on each end spar.

The heretofore known arrangements of the above mentioned type have the drawback that the loading of the vehicle has to be interrupted by the spars and the center beam. Moreover, the relatively great number of lids requires a correspondingly long time for opening and closing the same.

It is, therefore, an object of the present invention to provide a closure arrangement for vehicle, especially for railroad freight cars and trucks, which will ovecome the above mention drawbacks.

It is another object of this invention to provide a closure arrangement for vehicles, especially railroad freight cars and trucks, which will not only simplify but also considerably speed up the loading of vehicles equipped with such closure arrangement.

These and other objects and advantages of the invention will appear more clearly from the following specification in connection with the accompanying drawings, in which:

FIG. 1 diagrammatically illustrates a lateral view of a railroad freight car provided with a closure arrangement according to the present invention.

FIG. 2 is an end view of the upper portion of the railroad car of FIG. 1 illustrating a tiltable closure arrangement according to the present invention.

FIG. 3 illustrates the arrangement of a supporting roller in connection with a long tiltable roof.

FIG. 3a is a section along the line IIIa—IIIa of FIG. 3.

FIG. 3b is a perspective view of the detail shown in FIG. 3a.

General arrangement

Figure 4:
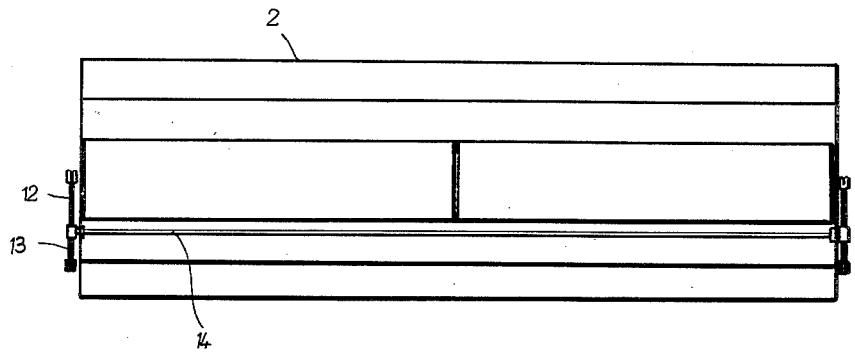
FIG. 4 illustrates the upper portion of the arrangement of FIG. 2 seen from the right-hand side thereof.
Figure 5:
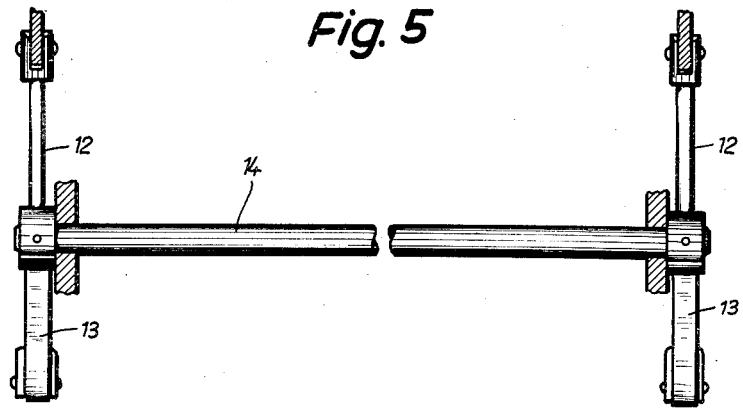
FIG. 5 illustrates on a scale larger than that of FIGS. 2 and 4 a side view partially in section of the arms 13.

The closure arrangement according to the present invention is characterized primarily in that the lid which forms a part of the vehicle roof and extends over the entime length of the roof is mounted so as to be tiltable about pivots arranged at the end faces of the vehicle. The closure lid will when occupying its closing position close a charging opening which extends over the entire length of the vehicle.

Inasmuch as particularly with long vehicles, the weight of the tiltable closure lid is considerable, the supporting columns which carry the lid adjacent the end surfaces of the vehicle, are provided with a work storage means. In this work storage means, the power is stored which is released during the opening of said lid so as to facilitate the closing of the lid. This arrangement may be so designed as to enable a single operator to close the lid. For purposes of tilting the columns carrying the lid and arranged at the end faces thereof, said columns are connected to a tiltable lever through the intervention of an adjustable safety pawl. The supporting columns for the lid are interconnected by conveying means such as links, crank lever and shaft.

In order with large lengths of the vehicle or long supporting widths for the lid, to prevent a deflection along the vehicle center, which would prevent a proper opening and closing, the lid may be provided with supporting rollers which move either on one or a plurality of partitions provided in connection with the employment of large boxes, or which move on spars. The support for the lid is in this instance advantageously effected in the closing position only and on a small opening path shortly ahead of or following the closing position.

Structural arrangement

Referring now to the drawings in detail, the vehicle illustrated therein as a railroad freight car 1 is provided in a manner known per se with a roof portion 2 provided with a longitudinal opening 3 extending over the entire car length. This opening is adapted to be closed by a closure lid 4 provided with columns or arms 5 and 6. The arms 5 and 6 are arranged at the end faces of the car and are tiltable about pivots 7 from the position shown in solid lines into the position shown in dot-dash lines in FIG. 2, and vice versa. The dot-dash line position is indicated by the letter A.

The closure lid 4, when occupying its closed position or its opened position, is within the confining line 8 so that the car can also with opened closure lid be moved without endangering structures at a level slightly higher than the freight car.

The supporting arms 5 and 6 have connected thereto power storage means 9 adapted to store the power gained during the opening of the closure lid 4 and to release said power during the closing stroke of said closure lid 4. This power storage means consists primarily according to FIG. 2 of a member 9a connected to the end wall of the car and forming the abutment for one end of a spring 9b. The other end of the spring 9b is engaged by an abutment member 9c which is fastened to a rod 9d extending through said spring 9b and linked at 9e to a plate 6a connected to the arm 6. It will thus be evident that when arm 6 is tilted into the position A, spring 9b will be compressed and in its tendency to expand again will aid the closing of closure lid 4. Similar power storage means may be arranged at the other end plate of the freight car.

The lower end of arm 5 or 6, in the structure illustrated in the drawings the lower end of arm 6, has connected thereto a tilting lever 10 which by means of a safety hook 11 may be connected to a stud 11a when the closure lid is in its closed position. There is provided a similar stud (not shown in the drawings) for engagement by hook 11 when the closure lid is in its opened position. Preferably only one of the arms 5 and 6 is provided with a safety hook and tilting lever 10 since this facilitates the operation of the tiltable roof or closure lid.

Arms 5 and 6 are interconnected by a link system 12, 13 and shaft 14 so that the arms 5 and 6 move simultaneously.

In order to prevent the closure lid 4 from deflection when the arrangement of the present invention is employed with cars of great length, the closure lid 4 is provided with one or more supporting rollers 15 adapted to roll on the upper edge surface of partitions (not shown) or on struts 16. While the supporting rollers occupy a position corresponding to the closing position of the closure lid or while the supporting rollers 15 roll on the edges of said partitions or on said struts during the opening phase shortly before reaching said closing position or shortly after leaving said closing position, the lid is not supported as is evident from the dot-dash line position of lid 4 in FIG. 3. This is due to the fact that the rollers due to the greater curvature of the car box lift themselves off from the latter or the edges of said partitions or from said struts.

It is, of course, to be understood that the present invention is, by no means, limited to the particular construction shown in the drawings but also comprises any modifications within the scope of the appended claim.

What we claim is:

In a closure system for vehicles, especially railway freight cars and trucks: a vehicle body having an end wall at each end thereof and being provided with a roof portion having a substantially centrally located longitudinal opening extending in the longitudinal direction of said vehicle substantially from one of said end walls to the other end wall; a single lid member movable selectively from an opening position in which said opening in said roof portion is uncovered into a closing position in which said opening is closed by said lid member; said lid member, when in said closing position, extending over the entire length and width of said opening so as to close the same; tilting arms respectively attached to said lid member at each end portion thereof and extending downwardly along said end walls and pivotally connected to said end walls for tilting said lid member to one side of said opening; a shaft extending longitudinally along said body and journaled thereon; a lever on each end of said shaft; link means operatively interconnecting said levers with the adjacent ones of said arms for uniform movement of said arms with each other; power storage means connected to said arms and arranged at one of said end walls only and responsive to the opening of said lid member for storing power produced by the opening of said lid member; said power storage means being adapted in response to the closing movement of said lid member to release the stored power for aiding the closing movement of said lid member; and strut means extending transverse to said opening intermediate to said walls, said lid member being provided with roller means for engagement with said strut means during the initial opening phase only and during the last closing phase only of said lid member.

References Cited in the file of this patent
UNITED STATES PATENTS

| | | |
|---|---|---|
| 496,163 | Lebach | Apr. 25, 1893 |
| 1,035,245 | Sanders | Aug. 13, 1912 |
| 1,125,056 | Buchanan | Jan. 19, 1915 |
| 1,347,174 | Murphy | July 20, 1920 |
| 1,628,543 | Jonsson | May 10, 1927 |
| 1,934,929 | Jonsson | Nov. 14, 1933 |
| 2,015,767 | Suckfield | Oct. 1, 1935 |
| 2,069,414 | Lentz et al. | Feb. 2, 1937 |
| 2,851,964 | Puckett | Sept. 16, 1958 |
| 2,899,912 | Janeczko | Aug. 18, 1959 |